E. G. & R. H. LINKHART.
SEPARATOR AND GRADER.
APPLICATION FILED FEB. 23, 1916.
1,265,687.
Patented May 7, 1918.
2 SHEETS—SHEET 2.
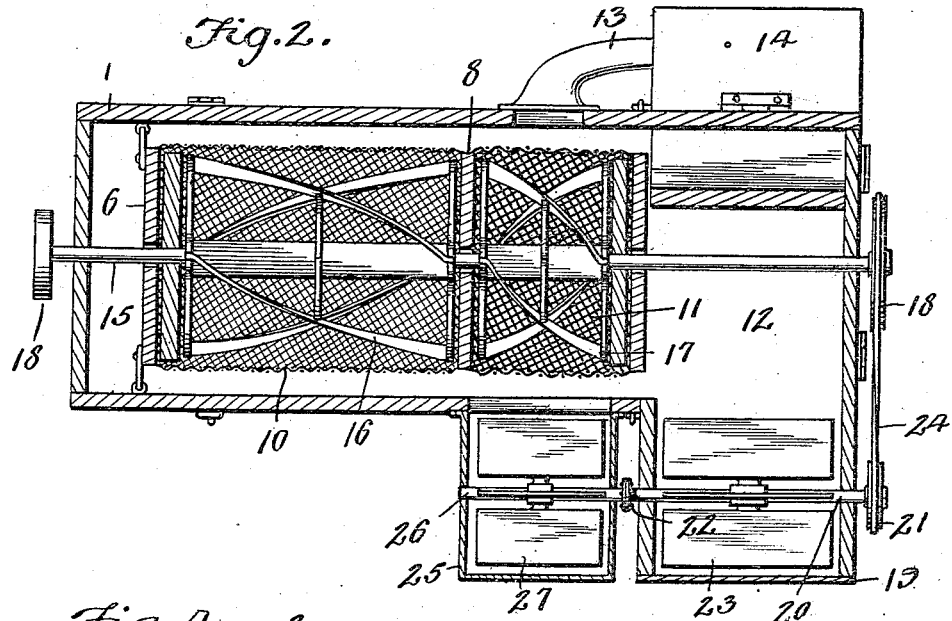
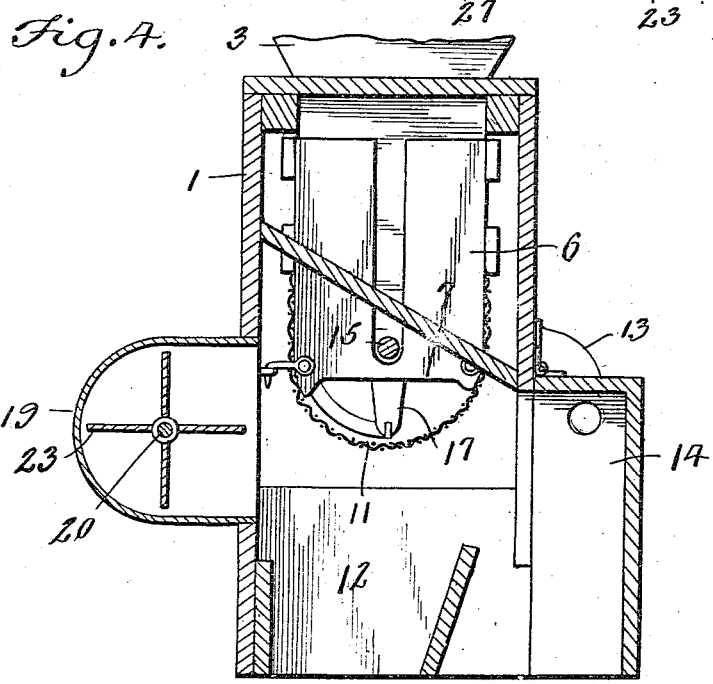
Witnesses
Inventors
E. G. Linkhart
and
R. H. Linkhart,
By Victor J. Evans
Attorney

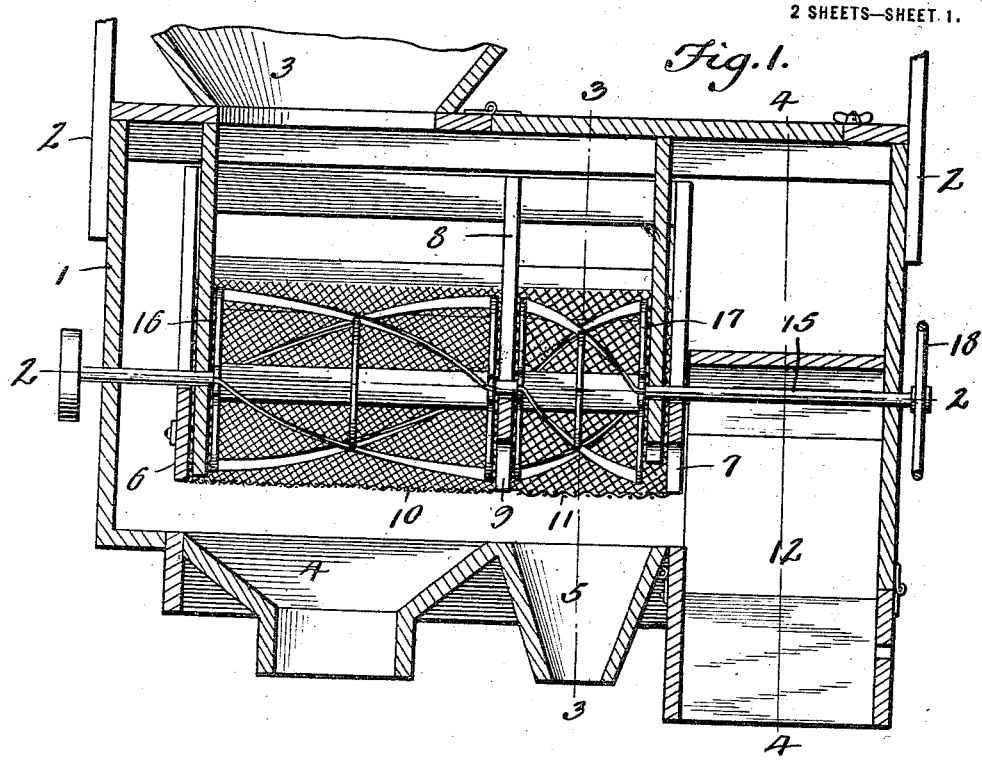

UNITED STATES PATENT OFFICE.

EARL G. LINKHART AND RALPH H. LINKHART, OF NORTH VERNON, INDIANA.

SEPARATOR AND GRADER.

1,265,687.   Specification of Letters Patent.   Patented May 7, 1918.

Application filed February 23, 1916. Serial No. 80,012.

*To all whom it may concern:*

Be it known that we, EARL G. LINKHART and RALPH H. LINKHART, citizens of the United States, residing at North Vernon, in the county of Jennings and State of Indiana, have invented new and useful Improvements in Separators and Graders, of which the following is a specification.

This invention relates to separators and graders, and it has particular reference to an improved machine for separating and grading cracked corn.

An object of the invention is to produce a simple and efficient machine, whereby cracked corn may be separated into various grades of fineness, such as coarse corn for chicken feed, fine cracked corn for chick feed, bread meal and bran. The present invention is an improvement over the structure shown in the patent to John W. Linkhart, No. 1,112,302, issued September 29, 1914.

When corn is ground for chicken feed, it is reduced to a mixture of particles, some of which are comparatively large, some small, some in the form of meal, and the balance the bran which is removed from the kernels. The larger size particles can be used to advantage as feed for grown or growing chickens, the smaller particles may be used to advantage as chick feed while the meal and bran may be employed for any of the useful or commercial purposes.

It is a prime object of the present invention to provide a machine, which, at one operation, will separate all of the different particles and accumulate them, in order that they may be disposed of in bulk.

With this object in view the machine includes a casing having two alined screens therein. One of the said screens is of finer mesh wire than the other and the mixed material is deposited upon the screen of finer mesh. A shaft is journaled for rotation in the casing and is provided with reels, adapted to operate over the said screens. Means is provided for directing a blast of air through the screen of coarser mesh, whereby the bran is removed from the material as it passes over the said coarser screen. Also, means are provided for directing a blast of air through the material which is discharged at the edge of the screen of coarser mesh, thus removing any particles of bran from the said discharge material which may remain in the same after subjected to the first mentioned blast of air. The bran which is removed from the material at the two points mentioned, is collected in a single chute or receptacle. When the mixed material first enters the casing and falls upon the screen of finer mesh, the meal is separated from the material, and gravitates through the said screen. As the material passes over the screen of coarser mesh, the relatively fine particles of corn or chick feed gravitate through the said screen. This material is accumulated in a suitable receptacle provided for its reception. The coarser particles of corn which leave the screen of coarser mesh, at the discharge edge or end thereof, is also accumulated in a suitable chute or receptacle.

Heretofore it has been the practice in preparing poultry feed to crack the corn and remove the meal and bran from the same. The corn thus cracked includes large and small particles, which may be used as feed for grown or growing chickens, but the appearance of this feed is detrimental in view of the presence of the smaller particles of corn. On the other hand, when the feed is prepared for baby chicks it is necessary to recrack the particles, in order to reduce them to a standard uniform small size. This entails additional labor and time, and consequently, advances the market value of the cracked corn especially adapted to be used as baby chick feed.

Inasmuch as the present machine provides at one operation the feeds of both characteristics, it will be seen that by the use of the machine great saving of time and labor is effected and at the same time advantage may be had of the best market prices for both kinds of feed in view of the fact that the large feed is uniformly large and the small feed uniformly small.

In the accompanying drawings:—

Figure 1 is a longitudinal vertical sectional view of the machine constructed in accordance with the invention.

Fig. 2 is a horizontal sectional view taken on the line 2—2 of Fig. 1.

Fig. 3 is a vertical sectional view taken on the line 3—3 of Fig. 1.

Fig. 4 is a vertical transverse sectional view taken on the line 4—4 of Fig. 1.

The improved machine instead of being provided with legs or supporting members after the fashion of ordinary machines of this class, is intended to be supported below the ceiling of a room by some suitable overhead supporting means, and to this end the casing 1 has been shown provided with supporting members 2 in the nature of planks, which are suitably secured upon the ends of the casing and extended upwardly therefrom, it being understood that these supporting members may be connected in any convenient manner with some overhead support, and that braces of any kind may be employed for supporting the casing firmly in position at a suitable elevation above the floor. In this manner it is intended to support the machine in suitable proximity to the grinding outfit so that the product of the latter may be fed directly into the separator casing.

A receiving hopper 3 is mounted upon the top of the casing 1 and chutes 4 and 5 are provided at the lower side of the said casing. A frame 6 is detachably mounted in the casing 1 and the said frame is provided at one end with an outlet opening 7. A partition 8 is located in the frame 6 between the ends thereof and the said partition is provided at its lower edge with an opening 9. The frame 6 is provided between one end and the partition 8 with a relatively fine screen 10, and between the partition 8 and that end having the opening 7 with a relatively coarse screen 11. The fine screen 10 is located above the chute 4 and the coarse screen 11 is located above the chute 5. The casing 1 is provided beyond the end of the frame 6 having the openings 7 with a chute 12. The casing 1 is provided at its side and opposite the coarse screen 11 with a bran chute 13 which communicates with a bran chute 14 located at the upper end of the chute 12. A shaft 15 extends longitudinally of the casing 1 and is journaled for rotation. The said shaft also traverses the length of the screens 10 and 11. The shaft 15 is provided with spiral reels 16 and 17 located above the screens 10 and 11 respectively. A belt pulley 18 is mounted upon one end of the shaft 15. A fan casing 19 is attached to the side of the casing 1 at the upper end of the chute 12 and opposite the upper end of the bran chute 14. A shaft 20 is journaled for rotation in the casing 19 and is provided at one end with a belt pulley 21 and at its other end with a coupling member 22. A fan 23 is mounted upon the shaft 20 and is inclosed in the casing 19. A belt 24 is trained around the pulleys 18 and 21. Any suitable means may be provided for rotating the shaft 15. A fan casing 25 is detachably mounted at the side of the casing 1 opposite the screen 11 and opposite the end of the bran chute 13. A shaft 26 is journaled for rotation in the casing 25 and may be operatively connected with the coupling member 23 in any suitable manner. A fan 27 is mounted upon the shaft 26 and is arranged to discharge a blast of air through the screen 11 and out through the bran chute 13.

It will be seen that as the material is introduced into the casing 1 through the hopper 3, the material first falls upon the screen 10 and the meal gravitates through the mesh of the said screen and passes through the hopper 4 into a suitable receptacle provided below the said hopper for the reception of the said material. The material which remains upon the upper side of the screen 10 is carried by the reel 16 toward the partition 8 and is forced through the opening 9 at the lower edge thereof where it is subjected to a blast of air from the fan 27. This blast lifts the bran from the said material and blows it out through the chute 13 and into the chute 14. At the same time, the relatively fine particles of corn pass through the mesh of the screen 9 and gravitate through the chute 5 into a receptacle provided at the lower end of the said chute for its reception. The material which will not pass through the mesh of the screen 11 is moved along the said screen by the reel 16 and through the opening 7 at the end of the frame 6. When the material is discharged through the said opening, it is subjected to a blast of air from the fan 23 which removes any remaining bran from the same and directs it into the chute 14. The larger particles of corn will gravitate through the chute 12 into a suitable receptacle provided below the end thereof for its reception.

When it is desired to use the casing merely for separating the meal and bran from the cracked corn, the frame 6 and its attached parts may be removed, the fan casing 25 may be detached from the casing, the shaft 26 uncoupled from the shaft 20, the shaft 15 removed from the casing and a shaft and screen similar to that shown in Patent No. 1,112,302 may be placed in position in the screen and operated to effect the separation of the meal and bran from the cracked particles of corn.

From the above description taken in conjunction with the accompanying drawings it will be seen that a separator of simple and durable structural arrangement is provided and that the parts mutually coöperate with each to effect at one operation the separation of meal and bran from cracked corn and also the separation of large particles of cracked corn from the smaller particles thereof.

Having described the invention what is claimed is:—

1. A machine of the character described comprising a casing, a frame located in the casing, a partition located in the frame and having an opening at the lower portion thereof, a relatively fine screen mounted upon the frame between one end thereof and the partition, a relatively coarse screen mounted upon the frame between the other end thereof and the partition, reels journaled for rotation at the opposite sides of the partition, means for discharging a blast of air transversely through the relatively coarse screen at a point beyond the end of the fine screen and means for discharging a blast of air through the casing beyond the edge of the relatively coarse screen.

2. A machine of the character described comprising a casing, a frame located in the casing and provided at one end with a discharge outlet, a partition located in the frame between the ends thereof and having an opening at the lower portion of its edge, reels journaled for rotation in the frame at the opposite sides of the partition, a relatively fine screen located between one end of the screen and the partition, a relatively coarse screen located between the other end of the frame and the partition, a chute located at the side of the frame opposite the relatively coarse screen, a chute located at the side of the casing beyond the end of the frame, said chutes communicating with each other, means for directing a blast of air transversely through the relatively coarse screen at a point beyond the end of the fine screen and means for directing a blast of air through the material discharged through the opening at the end of the frame.

In testimony whereof we affix our signatures in presence of two witnesses.

EARL G. LINKHART.
RALPH H. LINKHART.

Witnesses:
JOHN H. GREEN,
RALPH E. BOYLE.

Copies of this patent may be obtained for five cents each, by addressing the "Commissioner of Patents, Washington, D. C."